(12) United States Patent
Veregin et al.

(10) Patent No.: US 9,221,929 B2
(45) Date of Patent: Dec. 29, 2015

(54) CARRIER RESINS WITH IMPROVED RELATIVE HUMIDITY SENSITIVITY

(71) Applicants: Xerox Corporation, Norwalk, CT (US); National Research Council of Canada, Ottawa (CA)

(72) Inventors: Richard PN Veregin, Mississauga (CA); Qingbin Li, Edmonton (CA); Andriy Kovalenko, Edmonton (CA); Sergey Gusarov, Edmonton (CA)

(73) Assignees: Xerox Corporation, Norwalk, CT (US); National Research Council of Canada, Ottawa (CA)

( * ) Notice: Subject to any disclaimer, the term of this patent is extended or adjusted under 35 U.S.C. 154(b) by 0 days.

(21) Appl. No.: 14/643,707

(22) Filed: Mar. 10, 2015

(65) Prior Publication Data

US 2015/0183899 A1 Jul. 2, 2015

Related U.S. Application Data

(63) Continuation of application No. 13/855,866, filed on Apr. 3, 2013, now Pat. No. 8,974,995.

(51) Int. Cl.
| | |
|---|---|
| G03G 9/087 | (2006.01) |
| C08F 28/06 | (2006.01) |
| G03G 9/107 | (2006.01) |
| G03G 9/113 | (2006.01) |
| G03G 9/10 | (2006.01) |
| C08F 22/10 | (2006.01) |

(52) U.S. Cl.
CPC .............. *C08F 28/06* (2013.01); *C08F 22/10* (2013.01); *G03G 9/10* (2013.01); *G03G 9/107* (2013.01); *G03G 9/1133* (2013.01); *G03G 9/1138* (2013.01); *G03G 9/1139* (2013.01)

(58) Field of Classification Search
USPC ............... 526/256; 430/111.1, 111.3, 111.35
See application file for complete search history.

(56) References Cited

U.S. PATENT DOCUMENTS

2010/0248154 A1\* 9/2010 Nozaki ................ C07D 335/02
430/313

\* cited by examiner

*Primary Examiner* — Peter Vajda

(57) ABSTRACT

The disclosure describes dry acrylate resin particles, optionally, with a C/O of at least about 4, comprising a heterocycle comprising sulfur, exhibiting high charge and improved RH sensitivity.

12 Claims, No Drawings

CARRIER RESINS WITH IMPROVED RELATIVE HUMIDITY SENSITIVITY

FIELD

The disclosure relates generally to carrier resins, such as those having higher carbon:oxygen (C/O) ratios, where such monomers comprise at least one heterocyclic compound containing at least one sulfur atom, carrier resins containing such monomers, processes of making coatings comprising such resins, coatings comprising such carrier resins, carriers comprising such resins; and developers comprising such coated carriers, including combinations of toners, carrier resins and silica surface additives.

BACKGROUND

Properties of a toner are influenced by the materials and amounts of the materials of the toner. The charging characteristics of a toner also can depend on the carrier used in a developer composition, including, the carrier coating.

Toners having triboelectric charge within the range of about −30 μC/g to about −45 μC/g may be achieved by including smaller-sized silica particles as external additives, for example, silica particles having average sizes of less than about 20 nm, such as, for example, R805 (~12 nm) and/or R972 (~16 nm) (Evonik, N.J.). However, developability at areas of low toner area coverage degrades over time. That has been attributed to the smaller-sized additives being impacted into the toner surface over time.

The problem with smaller-sized additives may be addressed by using larger-sized additives, i.e., additives having a size of about 40 nm or larger such as, for example, RX50 silica, RX515H silica or SMT5103 titania (Evonik, N.J.). However, such toners do not exhibit as high a triboelectric charge and also exhibit charge through.

New carrier coatings are being developed that enable higher charge developers, particularly those with larger-sized additive packages. However, when such developers are tested at low area coverage followed by high area coverage, the developers tend to exhibit low or wrong sign toner due to charge through, i.e., the incumbent toner in the device becomes less negative or even of the wrong sign, that is, the opposite charge, i.e., positive, and the new (fresh) toner added may charge very negative. The presence of low charge and/or wrong sign toner can result in objectionable background.

There remain problems with providing high charge with good relative humidity (RH) sensitivity of charge to changing environmental conditions for carrier coating resin designs. For example, there remains a need to tune the charge of the carrier resin to produce higher toner charge.

Further, many toners contain silica as a surface additive. Silica can be a substantial charge driver for a toner, although silica is known to be RH sensitive. Hence, it is a goal to provide new carrier designs that work well with silica to improve RH sensitivity, while maintaining high charge.

SUMMARY

The instant disclosure describes carrier acrylate resins exhibiting high charge and improved RH sensitivity, including coated carrier compositions comprising an acrylate, optionally, containing a carbon to oxygen ratio of at least about 4, such as one comprising a cyclic hydrocarbon, such as one comprising a heterocyclic group comprising at least one sulfur, and developers comprising said carrier resins.

In embodiments, a carrier resin composition is disclosed including at least one first monomer having a structure as set forth in formula (I) or isomers thereof:

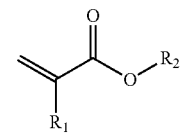

Formula (I)

where $R_1$ is methyl or H; and $R_2$ is an aryl, a cyclic heteroalkyl, a cyclic heteroalkylalkyl or a cyclic heteroalkylaryl, and where the aryl, cyclic heteroalkyl, cyclic heteroalkylalkyl or cyclic heteroalkylaryl contains at least one sulfur atom, and optionally, where the resin has a carbon:oxygen (C/O) ratio of at least about 4.

In embodiments, a process of preparing a latex carrier coating resin is disclosed including forming an emulsion comprising at least one surfactant, at least one first monomer having the formula as set forth in formula (I) or isomers thereof:

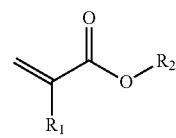

Formula (I)

where $R_1$ is methyl or H; and $R_2$ is a cyclic heteroalkyl, cyclic heteroalkylalkyl or acyclic heteroalkylaryl, and where the cyclic heteroalkyl, cyclic heteroalkylalkyl or cyclic heteroalkylaryl contains at least one sulfur atom; at least one second monomer, and optionally a carbon black; polymerizing the at least one first monomer and at least one second monomer to form a copolymer resin, where the resin has a particle size of about 50 nm to 500 nm; recovering the copolymer resin as a solution or drying the copolymer resin solution to form a powder, and coating the resin on a particle, such as one with a magnetic core.

A developer is disclosed including a toner and a coated carrier comprising a resin having at least one monomer with the structure as set forth in formula (I) or isomers thereof:

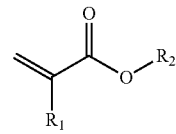

Formula (I)

where $R_1$ is methyl or H; and $R_2$ is a cyclic heteroalkyl, cyclic heteroalkylalkyl or a cyclic heteroalkylaryl, and where the cyclic heteroalkyl, cyclic heteroalkylalkyl or cyclic heteroalkylaryl contains at least one sulfur atom, and where the monomer has a carbon:oxygen (C/O) ratio of at least about 4.

DETAILED DESCRIPTION

The disclosure relates to acrylate carrier resins of high charge and improved RH sensitivity.

In embodiments, a carrier composition is disclosed comprising a polymer coating resin comprising at least one acrylate monomer having at least one heterocyclic group comprising at least one sulfur, where the monomer optionally has a carbon:oxygen (C/O) ratio of at least about 4, at least about 4.3, at least about 4.5, at least about 4.7, at least about 4.9, at least about 5, at least about 6 or greater. In embodiments, such molecules include, but are not limited to, tetrahydro-2H-thiopyran-4-yl 2-methylprop-2-enoate (including the isomer, tetrahydro-2H-thiopyran-2-yl 2-methylprop-2-cnoate or tetrahydro-2H-thiopyran-3-yl 2-methylprop-2-enoate).

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range, "from about 2 to about 4," also discloses the range, "from 2 to 4."

A, "heterocycle," is a cyclic hydrocarbon comprising one or more non-carbon atoms in a ring. Suitable non-carbon atoms include nitrogen, oxygen and sulfur.

An, "alkyl," group is a saturated, partially saturated, or unsaturated straight chain or branched non-cyclic hydrocarbon having from 1 to about 10 carbon atoms, from 1 to about 8 carbons, from 1 to about 6, from 1 to about 4, from about 2 to about 6 carbon atoms. An alkyl group can be substituted or unsubstituted.

A, "cyclic alkyl," group is a saturated, partially saturated, or unsaturated cyclic alkyl group of from 3 to about 10 carbon atoms having a single cyclic ring or multiple condensed or bridged rings which optionally can be substituted with from 1 to about 3 alkyl groups. In embodiments, the cycloalkyl group has 3 to about 8 ring members, the number of ring carbon atoms ranges from 3 to about 5, 3 to about 6 or 3 to about 7. A cycloalkyl group can be substituted or unsubstituted.

An, "aryl," group is an aromatic carbocyclic group of from about 6 to about 14 carbon atoms having a single ring (e.g., phenyl) or can be polycyclic, such as, having no common atoms, spiro rings, fused rings, bridged rings and so on, such as, multiple condensed rings (e.g., naphthyl or anthryl). In embodiments, aryl groups contain about 6 to about 14 carbon atoms, from about 6 to about 12, from about 6 to about 10 carbon atoms in the ring portions of the groups. An aryl group can be substituted or unsubstituted.

The phrase, "aryl groups," also includes groups containing fused rings, such as fused aromatic-aliphatic ring systems (e.g., indanyl, tetrahydronaphthyl and the like).

A, "heteroaryl," group is an aryl ring system having one to four heteroatoms as ring atoms in a heteroaromatic ring system, wherein the remainder of the atoms are carbon atoms. In embodiments, heteroaryl groups contain about 5 to about 6 ring atoms, from about 3 to about 10, from about 6 to about 9 atoms in the ring portions of the groups. Suitable heteroatoms include oxygen, sulfur and nitrogen. In embodiments, the heteroaryl ring system is monocyclic or bicyclic. A heteroaryl also can be bonded to other groups at any ring atom (i.e., at any carbon atom or heteroatom of the heterocyclic ring). A heteroaryl group can be substituted or unsubstituted. Heteroaryl groups encompass unsaturated, partially saturated and saturated ring systems. Heteroaryl includes fused ring species, including those comprising fused aromatic and non-aromatic groups. The phrase also includes bridged polycyclic ring systems containing a heteroatom.

A, "cyclic alkylalkyl," group is a radical of the formula: -alkyl-cycloalkyl, wherein alkyl and cycloalkyl are as defined above. Substituted cycloalkylalkyl groups may be substituted at the alkyl, the cycloalkyl or both portions of the group.

An, "aralkyl," group is a radical of the formula: -alkyl-aryl, wherein alkyl and aryl are as defined above. Substituted aralkyl groups may be substituted at the alkyl, the aryl, or both portions of the group.

A, "cyclic heteroalkylaryl," group is a radical of the formula: -alkyl-heteroaryl, wherein cyclic alkyl and heteraryl are as defined above. Substituted heteralkylaryl groups may be substituted at the alkyl, the heteroaryl, or both portions of the group.

By, "negative additives that are negatively chargeable to a reference carrier," is meant that the additives are negatively charging relative to the toner surface measured by determining the toner triboelectric charge with and without the additive. Similarly, by, "positive additives that are positively chargeable to a carrier," is meant that the additives are positively charging relative to the toner surface measured by determining the toner triboelectric charge with and without the additive.

Negative additives that are negatively chargeable to a carrier include, for example, silica particles, alumina particles or any small-sized particles (e.g., from about 7 to about 100 nm in volume average particle diameter as determined by any suitable technique) including, for example, polymeric microspheres, optionally treated with a composition rendering the particles negatively chargeable to a carrier on triboelectric contact therewith. The treating material may be, for example, a fluorosilane, for example, such as exemplified in U.S. Pat. No. 4,973,540, incorporated herein by reference in entirety, other halogen-containing organosilanes, such as described in U.S. Pat. No. 5,376,172, incorporated herein by reference in entirety, silazanes, siloxanes and the like.

Polymers

In embodiments, a developer is disclosed including an acrylate-coated carrier and a toner, where the toner may be an emulsion aggregation toner, containing, but not limited to, a latex resin, a wax and a polymer shell.

In embodiments, the latex resin may be composed of a first and a second monomer composition. Any suitable monomer or mixture of monomers may be selected to prepare the first monomer composition and the second monomer composition. The selection of monomer or mixture of monomers for the first monomer composition is independent of that for the second monomer composition and vice versa. Exemplary monomers for the first and/or the second monomer compositions include, but are not limited to, polyesters, styrene, alkyl acrylate, such as, methyl acrylate, ethyl acrylate, butyl arylate, isobutyl acrylate, dodecyl acrylate, n-octyl acrylate, 2-chloroethyl acrylate; β-carboxy ethyl acrylate (β-CEA), phenyl acrylate, methyl α-chloroacrylate, methyl methacrylate (MMA), ethyl methacrylate and butyl methacrylate; butadiene; isoprene; methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; N-vinyl pyrrolidone; methacrylate (MA); acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes;

isobutylene; and the like, and mixtures thereof. In case a mixture of monomers is used, typically the latex polymer will be a copolymer.

In embodiments, the first monomer composition and the second monomer composition may independently of each other comprise two or three or more different monomers. The latex polymer therefore can comprise a copolymer. Illustrative examples of such a latex copolymer includes poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylononitrile), and the like.

The first monomer composition and the second monomer composition may be substantially water insoluble, such as, hydrophobic, and may be dispersed in an aqueous phase with adequate stirring when added to a reaction vessel.

The weight ratio between the first monomer composition and the second monomer composition may be in the range of from about 0.1:99.9 to about 50:50, from about 0.5:99.5 to about 25:75, from about 1:99 to about 10:90.

The first monomer composition and the second monomer composition can be the same. Examples of the first/second monomer composition may be a mixture comprising styrene and alkyl acrylate, such as, a mixture comprising styrene, n-butyl acrylate and β-CEA. Based on total weight of the monomers, styrene may be present in an amount from about 1% to about 99%, from about 50% to about 95%, from about 70% to about 90%, although may be present in greater or lesser amounts; alkyl acrylate, such as, n-butyl acrylate, may be present in an amount from about 1% to about 99% from about 5% to about 50%, from about 10% to about 30%, although may be present in greater or lesser amounts.

The resins may be a polyester resin, such as, an amorphous resin, a crystalline resin, and/or a combination thereof, including the resins described in U.S. Pat. Nos. 6,593,049 and 6,756,176, the disclosure of each of which hereby is incorporated by reference in entirety. Suitable resins may also include a mixture of an amorphous polyester resin and a crystalline polyester resin as described in U.S. Pat. No. 6,830,860, the disclosure of which is hereby incorporated by reference in entirety.

In what follows, an "acid-derived component," indicates a constituent moiety that was originally an acid component before the synthesis of a polyester resin and an "alcohol-derived component" indicates a constituent moiety that was originally an alcoholic component before the synthesis of the polyester resin.

A "crystalline polyester resin," indicates one that shows not a stepwise endothermic amount variation but a clear endothermic peak in differential scanning calorimetry (DSC). However, a polymer obtained by copolymerizing the crystalline polyester main chain and at least one other component is also called a crystalline polyester if the amount of the other component is 50% by weight or less. Acids having 6 to 10 carbon atoms may be desirable for obtaining suitable crystal melting point and charging properties. To improve the crystallinity, a straight chain carboxylic acid may be present in an amount of about 95% by mole or more of the acid component and, in embodiments, more than about 98% by mole of the acid component. Other acids are not particularly restricted, and examples thereof include conventionally known divalent carboxylic acids and dihydric alcohols, for example those described in "Polymer Data Handbook: Basic Edition" (Soc. Polymer Science, Japan Ed.: Baihukan). As the alcohol component, aliphatic dialcohols having from about 6 to about 10 carbon atoms may be used to obtain desirable crystal melting points and charging properties. To raise crystallinity, it may be useful to use the straight chain dialcohols in an amount of about 95% by mole or more, about 98% by mole or more.

In embodiments, the resin may be a polyester resin formed by reacting a diol with a diacid in the presence of an optional catalyst. Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol may be, for example, selected in an amount of from about 40 to about 60 mole percent, from about 42 to about 55 mole percent, from about 45 to about 53 mole percent (although amounts outside of those ranges can be used). When present, an alkali sulfo-aliphatic diol can be selected in an amount of from about 0 to about 10 mole percent, from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of from about 40 to about 60 mole percent, from about 42 to about 52 mole percent, from about 45 to about 50 mole percent, and any present alkali sulfo-aliphatic diacid can be selected in an amount of from about 1 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 50 percent by weight of the toner components, from about 10 to about 35 percent by weight of the toner components. The crystalline resin can possess various melting points of, for example, from about 30° C. to about 120° C., from about 50° C. to about 90° C. The crystalline resin may have a number average molecular weight (Mn), as measured by gel permeation chromatography (GPC) of, for example, from about 1,000 to about 50,000, from about 2,000 to about 25,000, and a weight average molecular weight (Mw) of, for example, from about 2,000 to about 100,000, from about 3,000 to about 80,000, as determined by GPC. The molecular weight distribution (Mw/Mn) of the crystalline resin may be, for example, from about 2 to about 6, from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, from about 42 to about 52 mole percent of the resin, from about 45 to about 50 mole percent of the resin. Examples of the alkylene oxide adducts of bisphenol include polyoxypropylene (2.2)-2,2-bis(4-hydroxyphenyl) propane, polyoxypropylene (3.3)-2,2-bis(4-hydroxyphenyl) propane, polyoxyethylene (2.0)-2,2-bis(4-hydroxyphenyl) propane, polyoxyethylene (2.2)-2,2-bis(4-hydroxyphenyl) propane, polyoxypropylene (2.0)-polyoxyethylene (2.0)-2,2-bis(4-hydroxyphenyl) propane, and polyoxypropylene (6)-2,2-bis(4-hydroxyphenyl) propane. The compounds may be used singly or as a combination of two or more thereof.

Examples of additional diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, dipropylene glycol, dibutylene, and combinations thereof. The amount of organic diol selected can vary, and may be present, for example, in an amount from about 40 to about 60 mole percent of the resin, from about 42 to about 55 mole percent of the resin, from about 45 to about 53 mole percent of the resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

In embodiments, as noted above, an unsaturated amorphous polyester resin may be utilized as a latex resin. Examples of such resins include those disclosed in U.S. Pat. No. 6,063,827, the disclosure of which hereby is incorporated by reference in entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

The polyester resins may be synthesized from a combination of components selected from the above-mentioned monomer components, by using conventional known methods. Exemplary methods include the ester exchange method and the direct polycondensation method, which may be used singularly or in a combination thereof. The molar ratio (acid component/alcohol component) when the acid component and alcohol component are reacted, may vary depending on the reaction conditions. The molar ratio is usually about 1/1 in direct polycondensation. In the ester exchange method, a monomer such as ethylene glycol, neopentyl glycol or cyclohexanedimethanol, which may be distilled away under vacuum, may be used in excess.

Any suitable surfactants may be used for the preparation of the latex, pigment and wax dispersions according to the present disclosure. Depending on the emulsion system, any desired nonionic or ionic surfactant, such as, anionic or cationic surfactant, may be contemplated.

Examples of suitable anionic surfactants include, but are not limited to, sodium dodecylsulfate (SDS), sodium dodecylbenzene sulfonate, sodium dodecylnaphthalenesulfate, dialkyl benzenealkyl sulfates and sulfonates, abitic acid, NEOGEN R® and NEOGEN SC® available from Kao, Tayca Power®, available from Tayca Corp., DOWFAX®, available from Dow Chemical Co., and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$-trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy)ethanol (available from sanofi as ANTAROX 890®, IGEPAL CA-210®, IGEPAL CA-520®, IGEPAL CA-720®, IGEPAL CO-890®, IGEPAL CO-720®, IGEPAL CO-290®, IGEPAL CA-210® and ANTAROX 897®) and the like, as well as mixtures thereof.

Surfactants may be employed in any desired or effective amount, for example, at least about 0.01% by weight of total monomers used to prepare the latex polymer, at least about 0.1% by weight of total monomers used to prepare the latex polymer; and no more than about (1% by weight of total monomers used to prepare the latex polymer, no more than about 5% by weight of total monomers used to prepare the latex polymer, although the amount can be outside of those ranges.

Any suitable initiator or mixture of initiators may be used in the latex process and the toner process. In embodiments, the initiator is selected from known free radical polymerization initiators. The free radical initiator can be any free radical polymerization initiator capable of initiating a free radical polymerization process and mixtures thereof, such free radical initiator being capable of providing free radical species on heating to above about 30° C.

Although water soluble free radical initiators are used in emulsion polymerization reactions, other free radical initiators also can be used. Examples of suitable free radical initiators include, but are not limited to, peroxides, such as, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, diisopropyl peroxycarbonate, tetralin hydroperoxide, 1-phenyl-2-methylpropyl-1-hydroperoxide and tert-butylhydroperoxide; pertriphenylacetate, tert-butyl performate; tert-butyl peracetate; ten-butyl perbenzoate; tert-butyl perphenylacetate; tert-butyl permethoxyacetate; tert-butyl per-N-(3-toluyl)carbamate; sodium persulfate; potassium persulfate, azo compounds, such as, 2,2'-azobispropane, 2,2'-dichloro-2,2'-azobispropane, 1,1'-azo(methylethyl)diacetate, 2,2'-azobis(2-amidinopropane)hydrochloride, 2,2'-azobis(2-amidinopropane)-nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol A-4,4'-azobis-4-cyanopentano-ate) and poly(tetraethylene glycol-2,2'-azobisisobutyrate); 1,4-bis(pentaethylene)-2-tetrazene; 1,4-dimethoxycarbonyl-1,4-dipheny-l-2-tetraxene and the like; and mixtures thereof.

More typical free radical initiators include, but are not limited to, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate and the like.

Based on total weight of the monomers to be polymerized, the initiator may be present in an amount from about 0.1% to about 5%, from about 0.4% to about 4%, from about 0.5% to about 3%, although may be present in greater or lesser amounts.

A chain transfer agent optionally may be used to control the polymerization degree of the latex, and thereby control the molecular weight and molecular weight distribution of the product latexes of the latex process and/or the toner process according to the present disclosure. As can be appreciated, a chain transfer agent can become part of the latex polymer.

A chain transfer agent can have a carbon-sulfur covalent bond. The carbon-sulfur covalent bond has an absorption peak in a wave number region ranging from 500 to 800 cm$^{-1}$ in an infrared absorption spectrum. When the chain transfer agent is incorporated into the latex and the toner made from the latex, the absorption peak may be changed, for example, to a wave number region of 400 to 4,000 cm$^{-1}$.

Exemplary chain transfer agents include, but are not limited to, n-$C_{3-15}$ alkylmercaptans, such as, n-propylmercaptan, n-butylmercaptan, n-amylmercaptan, n-hexylmercaptan, n-heptylmercaptan, n-octylmercaptan, n-nonylmercaptan, n-decylmercaptan and n-dodecylmercaptan; branched alkylmercaptans, such as, isopropylmercaptan, isobutylmercaptan, s-butylmercaptan, tert-butylmercaptan, cyclohexylmercaptan, tert-hexadecylmercaptan, tert-laurylmercaptan, tert-nonylmercaptan, tert-octylmercaptan and tert-tetradecylmercaptan; aromatic ring-containing mercaptans, such as, allylmercaptan, 3-phenylpropylmercaptan, phenylmercaptan and mercaptotriphenylmethane; and so on. The terms, "mercaptan," and, "thiol," may be used interchangeably to mean C—SH group.

Examples of such chain transfer agents also include, but are not limited to, dodecanethiol, butanethiol, isooctyl-3-mercaptopropionate, 2-methyl-5-t-butyl-thiophenol, carbon tetrachloride, carbon tetrabromide and the like.

Based on total weight of the monomers to be polymerized, the chain transfer agent may be present in an amount from about 0.1% to about 7%, from about 0.5% to about 6%, from about 1.0% to about 5%, although may be present in greater or lesser amounts.

In embodiments, a branching agent optionally may be included in the first/second monomer composition to control the branching structure of the target latex. Exemplary branching agents include, but are not limited to, decanediol diacrylate (ADOD), trimethylolpropane, pentaerythritol, trimellitic acid, pyromellitic acid and mixtures thereof.

Based on total weight of the monomers to be polymerized, the branching agent may be present in an amount from about 0% to about 2%, from about 0.05% to about 1.0%, from about 0.1% to about 0.8%, although may be present in greater or lesser amounts.

In the latex process and toner process of the disclosure, emulsification may be done by any suitable process, such as, mixing at elevated temperature. For example, the emulsion mixture may be mixed in a homogenizer set at about 200 to about 400 rpm and at a temperature of from about 20° C. to about 80° C. for a period of from about 1 min to about 20 min, although temperatures and times outside of those ranges can be used.

Any type of reactor may be used without restriction. The reactor can include means for stirring the compositions therein, such as, an impeller. A reactor can include at least one impeller. For forming the latex and/or toner, the reactor can be operated throughout the process such that the impellers can operate at an effective mixing rate of about 10 to about 1,000 rpm.

Following completion of the monomer addition, the latex may be permitted to stabilize by maintaining the conditions for a period of time, for example for about 10 to about 300 min, before cooling. Optionally, the latex formed by the above process may be isolated by standard methods known in the art, for example, coagulation, dissolution and precipitation, filtering, washing, drying or the like.

The latex of the present disclosure may be selected for emulsion-aggregation-coalescence processes for forming toners, inks and developers by known methods.

The latex of the present disclosure may be melt blended or otherwise mixed with various toner ingredients, such as, an optional wax dispersion, an optional colorant, an optional coagulant, an optional silica, an optional charge enhancing additive or charge control additive, an optional surfactant, an optional emulsifier, an optional flow additive and the like. Optionally, the latex (e.g. around 40% solids) may be diluted to the desired solids loading (e.g. about 12 to about 15% by weight solids), before formulated in a toner composition.

Based on the total toner weight, the latex may be present in an amount from about 50% to about 98%, from about 60% to about 97%, from about 70% to about 95%, although may be present in greater or lesser amounts. Methods of producing such latex resins may be carried out as described in the disclosure of U.S. Pat. No. 7,524,602, herein incorporated by reference in entirety.

Colorants

Various known suitable colorants, such as dyes, pigments, mixtures of dyes, mixtures of pigments, mixtures of dyes and pigments and the like may be included in the toner. The colorant may be included in the toner in an amount of, for example, about 0.1 to about 35% by weight of the toner, from about 1 to about 15% percent of the toner, from about 3 to about 10% by weight of the toner, although amounts outside those ranges may be utilized.

As examples of suitable colorants, mention may be made of carbon black like REGAL 330®; magnetites, such as, Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes, or mixtures thereof, are used. The pigment or pigments can be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corp., Ltd., Toronto, CA, NOVAPERM YELLOW FGL™, HOSTAPERM PINK E™ from sanofi, CINQUASIA MAGENTA™ available from E.I. DuPont de Nemours & Co. and the like. Colorants that can be selected are black, cyan, magenta, yellow and mixtures thereof. Examples of magenta colorants are 2,9-dimethyl-substituted quinacridone and anthraquinone dye identified in the Color Index (CI) as CI 60710, CI Dispersed Red 15, diazo dye identified in the Color Index as CI 26050, CI Solvent Red 19 and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™, and cyan components also may be selected as colorants. Other known colorants can be selected, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G01 (sanofi), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF). Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (sanofi). Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (sanofi), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann, CA), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300) (BASF), combinations of the foregoing and the like.

Wax

In addition to the polymer resin, the toners of the present disclosure also may contain a wax, which can be either a single type of wax or a mixture of two or more different waxes. A single wax can be added to toner formulations, for example, to improve particular toner properties, such as, toner particle shape, presence and amount of wax on the toner particle surface, charging and/or fusing characteristics, gloss, stripping, offset properties and the like. Alternatively, a combination of waxes can be added to provide multiple properties to the toner composition.

When included, the wax may be present in an amount of, for example, from about 1 wt % to about 25 wt % of the toner particles, from about 5 wt % to about 20 wt % of the toner particles. The melting point of a wax can be at least about 30° C., at least about 40° C., at least about 50° C.

Waxes that may be selected include waxes having, for example, a weight average molecular weight of from about 500 to about 20,000, from about 1,000 to about 10,000. Waxes that may be used include, for example, polyolefins, such as, polyethylene, polypropylene and polybutene waxes, such as, commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K.K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax, microcrystalline wax and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate, pentaerythritol tetra behenate; ester waxes obtained from higher fatty acid and multivalent alcohol multimers, such as, diethyleneglycol monostearate, dipropyleneglycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™ and SUPERSLIP 6530™ available from Micro Powder Inc., fluorinated waxes, for example, POLYFLUO 190™, POLYFLUO 200™, POLYSILK 19™ and POLYSILK 14™ available from Micro Powder Inc., mixed fluorinated, amide waxes, for example, MICROSPERSION 19™ available from Micro Powder Inc., imides, esters, quaternary amines, carboxylic acids or acrylic polymer emulsion, for example JONCRYL 74™, 89™, 130™, 537™ and 538™, all available from SC Johnson Wax, and chlorinated polypropylenes and polyethylenes available from Allied Chemical and Petrolite Corporation and SC Johnson wax. Mixtures and combinations of the foregoing waxes also may be used in embodiments. Waxes may be included as, for example, fuser roll release agents.

Toner Preparation

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which smaller-sized resin particles are aggregated to the appropriate toner particle size and then coalesced to achieve the final toner particle shape and morphology.

Toner compositions may be prepared by emulsion-aggregation processes, such as, a process that includes aggregating a mixture of an optional wax and any other desired or required additives, and emulsions including the resins described above, optionally with surfactants, as described above, and then optionally coalescing the aggregate mixture. A mixture may be prepared by adding an optional wax, an optional colorant or other materials, which optionally also may be in a dispersion(s) including a surfactant, to the emulsion, which may be a mixture of two or more emulsions containing the resin. The pH of the resulting mixture may be adjusted by an acid, such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute (rpm). Homogenization may be accomplished by any suitable means, including, for example, with an IKA ULTRA TURRAX T50 probe homogenizer.

Following preparation of the above mixture, an aggregating agent may be added to the mixture. Suitable aggregating agents include, for example, aqueous solutions of a divalent cation or a multivalent cation material. The aggregating agent may be, for example, polyaluminum halides, such as, polyaluminum chloride (PAC), or the corresponding bromide, fluoride or iodide, polyaluminum silicates, such as, polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature ($T_g$) of the resin.

The aggregating agent may be added to the mixture to form a toner in an amount of, for example, from about 0.1 parts per hundred (pph) to about 1 pph, from about 0.25 pph to about 0.75 pph.

The gloss of a toner may be influenced by the amount of retained metal ion, such as, $Al^{3+}$, in the particle. The amount of retained metal ion may be adjusted further by the addition of a chelator, such as, ethylene diamine tetraacetic acid (EDTA). In embodiments, the amount of retained metal ion, for example, $Al^{3+}$, in toner particles of the present disclosure may be from about 0.1 pph to about 1 pph, from about 0.25 pph to about 0.8 pph.

To control aggregation and coalescence of the particles, the aggregating agent may be metered into the mixture over time. For example, the agent may be metered into the mixture over a period of from about 5 to about 240 min, from about 30 to about 200 min. Addition of the agent may also be done while the mixture is maintained under stirred conditions, in embodiments, from about 50 rpm to about 1,000 rpm, from about 100 rpm to about 500 rpm, and at a temperature that is below the $T_g$ of the resin.

The aggregation thus may proceed by maintaining the elevated temperature, or slowly raising the temperature to, for example, from about 40° C. to about 100° C., and holding the mixture at that temperature for a time from about 0.5 hr to about 6 hr, from about 1 hr to about 5 hr. while maintaining stirring, to provide the aggregated particles. In embodiments, the particle size may be about 5.0 to about 6.0 μm, from about 6.0 to about 6.5 μm, from about 6.5 to about 7.0 μm.

The particles may be permitted to aggregate until a predetermined desired particle size is obtained. Particle size can be monitored as known in the art, for example, with a COULTER COUNTER, for average particle size.

Once the desired final size of the toner particles is achieved, the pH of the mixture may be adjusted with a base to a value of from about 6 to about 10, from about 5 to about 8. The adjustment of the pH may be utilized to freeze, that is, to stop, toner growth. The base utilized to stop toner growth may include any suitable base, such as, for example, alkali metal hydroxides, such as, for example, sodium hydroxide, potassium hydroxide, ammonium hydroxide, combinations thereof and the like. In embodiments, EDTA may be added to help adjust the pH to the desired values noted above. The base may be added in amounts from about 2 to about 25% by weight of the mixture, from about 4 to about 10% by weight of the mixture.

Shell Resin

In embodiments, a shell may be applied to the formed aggregated toner particles. Any resin described above as suitable for the core resin may be utilized as the shell resin. The shell resin may be applied to the aggregated particles by any method within the purview of those skilled in the art. In embodiments, the shell resin may be in an emulsion including any surfactant described herein. The aggregated particles described above may be combined with said emulsion so that the resin forms a shell over the formed aggregates. In embodiments, an amorphous polyester may be utilized to form a shell over the aggregates to form toner particles having a core-shell configuration.

Toner particles can have a diameter of from about 4 to about 8 μm, from about 5 to about 7 μm, and the optional shell component may comprise about 26 to about 30% by weight of the toner particles. Alternatively, a thicker shell may be desirable to provide desirable charging characteristics due to the higher surface area of the toner particle. Thus, the shell resin may be present in an amount from about 30% to about 50% by weight of the toner particles, from about 30% to about 45% by weight of the toner particles, from about 30% to about 40% by weight of the toner particles. In embodiments, the shell has a higher $T_g$ than the aggregated toner particles.

In embodiments, a photoinitiator may be included in the resin mixture for forming the shell. Thus, the photoinitiator may be in the core, the shell, or both. The photoinitiator may be present in an amount of from about 1% to about 5% by weight of the toner particles, in embodiments, from about 2% to about 4% by weight of the toner particles.

Coalescence

Following aggregation to the desired particle size, with the optional formation of a shell as described above, the particles then may be coalesced to the desired final shape, the coalescence being achieved by, for example, heating the mixture to a temperature of from about 55° C. to about 100° C., from about 65° C. to about 75° C., which may be below the melting point of a crystalline resin to prevent plasticization. Higher or lower temperatures may be used, it being understood that the temperature is a function of the resins used.

Coalescence may proceed over a period of from about 0.1 to about 9 hr, from about 0.5 to about 4 hr.

After coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method, for example, freeze drying.

Additives

Toner particles also may contain other optional additives, as desired or required. For example, the toner may include any known charge additives in amounts of from about 0.1 to about 10 wt %, from about 0.5 to about 7 wt % of the toner. Examples of such charge additives include alkyl pyridinium halides, bisulfates, the charge control additives of U.S. Pat. Nos. 3,944,493, 4,007,293, 4,079,014, 4,394,430 and 4,560, 635, the disclosure of each of which hereby is incorporated by reference in entirety, negative charge enhancing additives like aluminum complexes, and the like.

Surface additives can be added to the toner compositions after washing or drying. Other examples of such surface additives include, for example, metal salts, metal salts of fatty acids, colloidal silicas, metal oxides, strontium titanates, mixtures thereof and the like. Surface additives may be present in an amount of from about 0.1 to about 10 wt %, from about 0.5 to about 7 wt % of the toner. Examples of such additives include those disclosed in U.S. Pat. Nos. 3,590,000, 3,720, 617, 3,655,374 and 3,983,045, the disclosure of each of which hereby is incorporated by reference in entirety. Other additives include zinc stearate and AEROSIL R972® (Degussa). The coated silicas of U.S. Pat. Nos. 6,190,815 and 6,004,714, the disclosure of each of which hereby is incorporated by reference in entirety, also can be present in an amount of from about 0.05 to about 5%, from about 0.1 to about 2% of the toner, which additives can be added during aggregation or blended into the formed toner product.

The characteristics of the toner particles may be determined by any suitable technique and apparatus. Volume average particle diameter $D_{50v}$, $GSD_v$ and $GSD_n$ may be measured by means of a measuring instrument, such as, a Beckman Coulter MULTISIZER 3, operated as recommended by the manufacturer. Toners may possess favorable charging characteristics when exposed to extreme RH conditions.

Utilizing the methods of the present disclosure, desirable gloss levels may be obtained. Thus, for example, the gloss level of a toner may have a gloss, as measured with a Gardner device of from about 20 gloss units (gu) to about 100 gu, from about 50 gu to about 95 gu, from about 60 gu to about 90 gu.

In embodiments, toners of the present disclosure may be utilized as ultra low melt (ULM) toners. In embodiments, the dry toner particles, exclusive of external surface additives, may have the following characteristics:

(1) circularity of from about 0.9 to about 1 (measured with, for example, a Sysmex 3000), from about 0.95 to about 0.99, from about 0.96 to about 0.98;

(2) Tg of from about 45° C. to about 60° C., from about 48° C. to about 55° C.; and/or (3) melt flow index (MFI) in g/10 min (5 kg/130° C.) of from about 79.0 to about 172.5.

Toners may possess favorable charging characteristics when exposed to extreme RH conditions. The low humidity zone (C zone) may be about 12° C./15% RH, while the high humidity zone (A zone) may be about 28° C./85% RH. Toners of the disclosure may possess a parent toner charge per mass ratio (q/m) of from about −5 µC/g to about −80 µC/g, from about −10 µC/g to about −70 µC/g, and a final toner charging after surface additive blending of from −15 µC/g to about −60 µC/g, from about −20 µC/g to about −55 µC/g.

Carriers

Various suitable solid core or particle materials can be utilized for the carriers and developers of the present disclosure. Characteristic particle properties include those that, in embodiments, will enable the toner particles to acquire a positive charge or a negative charge, and carrier cores that provide desirable flow properties in the developer reservoir present in an electrophotographic imaging apparatus. Other desirable properties of the core include, for example, suitable magnetic characteristics that permit magnetic brush formation in magnetic brush development processes; desirable mechanical aging characteristics; and desirable surface morphology to permit high electrical conductivity of any developer including the carrier and a suitable toner.

Examples of carrier particles or cores that can be utilized include iron and/or steel, such as, atomized iron or steel powders available from Hoeganaes Corp. or Pomaton S.p.A (IT); ferrites, such as, Cu/Zn-ferrite containing, for example, about 11% copper oxide, about 19% zinc oxide, and about 70% iron oxide, including those commercially available from D.M. Steward Corp. or Powdertech Corp., Ni/Zn-ferrite available from Powdertech Corp., Sr (strontium)-ferrite, containing, for example, about 14% strontium oxide and about 86% iron oxide, commercially available from Powdertech Corp., and Ba-ferrite; magnetites, including those commercially available from, for example, Hoeganaes Corp. (SW); nickel; combinations thereof, and the like. Other suitable carrier cores are illustrated in, for example, U.S. Pat. Nos. 4,937,166, 4,935,326 and 7,014,971, the disclosure of each of which hereby is incorporated by reference in entirety, and may include granular zircon, granular silicon, glass, silicon dioxide, combinations thereof, and the like. In embodiments, suitable carrier cores may have an average particle size of, for example, from about 40 µm to about 200 µm in diameter, from about 60 µm to about 400 µm in diameter, from about 20 µm to about 500 µm in diameter.

In embodiments, a ferrite may be utilized as the core, including a metal, such as, iron and at least one additional metal, such as, copper, zinc, nickel, manganese, magnesium, calcium, lithium, strontium, zirconium, titanium, tantalum, bismuth, sodium, potassium, rubidium, cesium, strontium, barium, yttrium, lanthanum, hafnium, vanadium, niobium, aluminum, gallium, silicon, germanium, antimony, combinations thereof and the like.

The polymeric coating on the core metal includes a latex, in embodiments, the latex can comprise a copolymer. In embodiments, a latex copolymer utilized as the coating of a carrier core may include at least one acrylate, optionally an acidic acrylate monomer, and optionally a conductive material, such as, a carbon black. Suitable cycloacrylates which may be utilized in forming the polymer coating include, for example, cyclohexylmethacrylate (CHMA or PCHMA for polyCHMA), cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, combinations thereof and the like.

In embodiments, a coating may include a copolymer of cyclohexylmethacrylate with isobornyl methacrylate, with the cyclohexylmethacrylate present in an amount of from about 0.1% to about 99.9% by weight of the copolymer, from about 35% to about 65% by weight of the copolymer, with the isobornyl methacrylate present in an amount from about 99.9% to about 0.1% by weight of the copolymer, from about 65% to about 35% by weight of the copolymer.

Charge control agent monomers include, but are not limited to, acidic acrylates and dialkylaminoacrylates. Suitable acidic acrylate monomers which may be utilized in forming the polymer coating include, for example, acrylic acid, methacrylic acid, β-carboxyethyl acrylate, combinations thereof and the like. Suitable dialkylaminoacrylates which may be utilized in forming the polymer coating include, for example, dimethylamino ethyl methacrylate (DMAEMA), 2-(dimethylamino) ethyl methacrylate, diethylamino ethyl methacrylate, dimethylamino butyl methacrylate, methylamino ethyl methacrylate, combinations thereof and the like.

By negative additives that are negatively chargeable to a reference carrier is meant that the additives are negatively charging relative to the toner surface measured by determining the toner triboelectric charge with and without the additives. Similarly, by positive additives that are positively chargeable to a carrier is meant that the additives are positively charging relative to the toner surface measured by determining the toner triboelectric charge with and without the additives.

Where the cycloacrylate is combined with a charge control agent monomer, the cycloacrylate may be present in a copolymer utilized as a polymeric coating of a carrier core in an amount of from about 0.1% by weight of the copolymer to about 99.8% by weight of the copolymer, from about 50% by weight of the copolymer to about 95% by weight of the copolymer. The charge control agent monomer may be present in such a copolymer in an amount of from about 0.1% by weight of the copolymer to about 5% by weight of the copolymer.

Carrier resins with high C/O ratios (e.g., CHMA) improve RH sensitivity while providing good charge, as compared to, for example, PMMA.

Thus, in embodiments, A zone charge may be from about −15 to about −60 µC/g, from about −20 to about −55 µC/g, while C zone charge may be from about −15 to about −60 µC/g, from about −20 to about −55 µC/g. The ratio of A zone charge to C zone charge, sometimes referred to herein as the RH ratio, may be from about 0.4 to about 1.0, from about 0.6 to about 0.8.

As provided hereinabove, suitable such cyclic compounds include heterocycles comprising sulfur. Hence, molecules such as, thianes, thiepanes, thietanes, thietes, thiirenes, thiiranes, dithiocanes, trithiocanes, dithioncanes, trithianes, dithiepanes, thiopyrans, thiolanes, trithepanes, thiolanes, dithiolanes, thiophenes, dithiolanes, dithianes, thiepines, thiocanes, dithietanes, benzothiophenes, benzoisothiazoles, benzothiazines, isothiazoles, thiasines, benzothiazines, thianthrenes and so on can be used in the practice of the teachings herein. Such reagents are available commercially (for example, Alfa Aesar, Chiron AS, Endeavor Specialty Chemicals, MP Biomedicals etc.) or can be synthesized as known in the art, for example, Hanna et al., J Chem Technol Biotechnol 60(3)257-262, 1994.

Hence, such heterocycles are incorporated into a carrier resin. The heterocycle can be used as a monomer, one reagent of a copolymer or can be a pendant group of a monomer. Hence, a heterocycle can be joined to an acrylate or other monomer used to make a latex for synthesizing carrier resin. For example, a thiane residue is appended to acrylic acid, acrylate, methacrylate, methacrylic acid, ethyl acrylate, butyl acrylate and so on as known in the art. The acrylate carrying a heterocycle as taught herein then is incorporated into a resin practicing methods taught herein or as known in the art.

Methods for forming the polymeric coating are within the purview of those skilled in the art and include, emulsion polymerization of the monomers utilized to form the polymeric coating as taught herein.

In the polymerization process, the reactants may be added to a suitable reactor, such as a mixing vessel. The appropriate amount of starting materials may be optionally dissolved in a solvent, an optional initiator may be added to the solution, and optionally contacted with at least one surfactant to form an emulsion. A copolymer may be formed in the emulsion, which may then be recovered and used as the polymeric coating of a carrier particle.

Where utilized, suitable solvents include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, the latex for forming the polymeric coating may be prepared in an aqueous phase containing a surfactant or co-surfactant, optionally under an inert gas such as nitrogen. Surfactants which may be utilized with the resin to form a latex dispersion can be ionic or nonionic surfactants as taught herein in an amount of from about 0.01 to about 15 wt % of the solids, from about 0.1 to about 10 wt % of the solids.

In embodiments, an initiator as taught herein may be added for forming a latex for a carrier polymeric coating. Examples of suitable initiators include water soluble initiators, such as, ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate and combinations thereof.

Initiators can be added in suitable amounts, such as, from about 0.1 to about 8 wt %, from about 0.2 to about 5 wt % of the monomers.

In forming the emulsions, the starting materials, surfactant, optional solvent and optional initiator may be combined utilizing any means within the purview of those skilled in the art. In embodiments, the reaction mixture may be mixed for from about 1 min to about 72 hrs, from about 4 hrs to about 24 hrs (although times outside those ranges may be utilized), while keeping the temperature at from about 10° C. to about 100° C., from about 20° C. to about 90° C., from about 45° C. to about 75° C., although temperatures outside those ranges may be utilized.

Those skilled in the art will recognize that optimization of reaction conditions, temperature, and initiator loading can be varied to generate resins of various molecular weights, and that structurally related starting materials may be polymerized using comparable techniques.

Once the copolymer has been formed, the resin may be recovered from the emulsion by any technique within the purview of those skilled in the art, including filtration, drying, centrifugation, spray drying, combinations thereof and the like.

In embodiments, once obtained, the copolymer utilized as the coating for a carrier may be dried to powder form by any method within the purview of those skilled in the art, including, for example, freeze drying, optionally in a vacuum, spray drying, combinations thereof and the like.

Particles of the copolymer may have a size of from about 40 nm to about 500 nm, from about 50 nm to about 400 nm, from about 60 nm to about 300 nm, from about 20 nm to about 250 nm, from about 30 nm to about 225 nm, from about 40 nm to about 200 nm, from about 45 nm to about 175 nm.

In embodiments, if the size of the particles of the dried polymeric coating is too large, the particles may be subjected to homogenizing or sonication to further disperse the particles and break apart any agglomerates or loosely bound particles, thereby obtaining particles, such as, primary particles, of the sizes noted above. Where utilized, a homogenizer may operate at a rate of from about 6,000 rpm to about 10,000 rpm, from about 7,000 to about 9,750 rpm, for a period of from about 0.5 mins to about 60 mins, from about 5 mins to about 30 mins, although speeds and times outside those ranges may be utilized.

The copolymers utilized as the carrier coating may have an Mn of from about 60,000 to about 400,000, from about 170,000 to about 280,000, and an Mw of from about 200,000 to about 800,000, from about 400,000 to about 600,000.

The copolymers utilized as the carrier coating may have a $T_g$ of from about 85° C. to about 140° C., from about 100° C. to about 130° C.

There may be added to the carrier a number of additives, for example, charge enhancing additives, including particulate amine resins, such as, melamine, alkyl-amino acrylates and methacrylates, polyamides, and fluorinated polymers, such as polyvinylidine fluoride and poly(tetrafluoroethylene) and fluoroalkyl methacrylates, such as 2,2,2-trifluoroethyl methacrylate. Other charge enhancing additives which may be utilized include quaternary ammonium salts, including distearyl dimethyl ammonium methyl sulfate (DDAMS), bis[1-[(3,5-disubstituted-2-hydroxyphenyl)azo]-3-(mono-substituted)-2-naphthalenolato(2-)]chromate(1-), cetyl pyridinium chloride (CPC), FANAL PINK® D4830, combinations thereof, and the like, and other effective known charge agents or additives. The charge additive components may be selected in various effective amounts, such as, from about 0.5 wt % to about 20 wt %, from about 1 wt % to about 3 wt %, based, for example, on the sum of the weights of polymer/copolymer, conductive component, and other charge additive components.

Addition of conductive components can act to increase further the negative triboelectric charge imparted to the carrier, and therefore, further increase the negative triboelectric charge imparted to the toner in, for example, an electrophotographic development subsystem. The components may be included by roll mixing, tumbling, milling, shaking, electrostatic powder cloud spraying, use of a fluidized bed, electrostatic disc processing, and use of an electrostatic curtain, as described, for example, in U.S. Pat. No. 6,042,981, the disclosure of which hereby is incorporated by reference in entirety, and wherein the carrier coating is fused to the carrier core in either a rotary kiln or by passing through a heated extruder apparatus.

Conductivity can be important for semiconductive magnetic brush development to enable good development of solid areas which otherwise may be weakly developed. Addition of a polymeric coating of the present disclosure, optionally with a conductive component, such as, carbon black, can result in carriers with decreased developer triboelectric response with change in relative humidity of from about 20% to about 90%, from about 40% to about 80%, that is, the charge is more consistent when the relative humidity changes. Thus, there is less decrease in charge at high relative humidity reducing background toner on the prints, and less increase in charge and subsequently less loss of development at low relative humidity, resulting in such improved image quality performance due to improved optical density.

As noted above, the polymeric coating may be dried, after which the dried resin coating may be applied to the core carrier as a dry powder. Powder coating processes differ from conventional solution coating processes. Solution coating requires a coating polymer whose composition and molecular weight properties enable the resin to be soluble in a solvent in the coating process. That requires relatively low Mw components as compared to powder coating. The powder coating process does not require solvent solubility, but does require the resin coated as a particulate with a particle size of from about 10 nm to about 2 µm, from about 30 nm to about 1 µm, from about 50 nm to about 500 nm.

Examples of processes which may be utilized to apply the powder coating include, for example, combining the carrier core material and copolymer coating by cascade roll mixing, tumbling, milling, shaking, electrostatic powder cloud spraying, use of a fluidized bed, electrostatic disc processing, use of electrostatic curtains, combinations thereof and the like. When resin-coated carrier particles are prepared by a powder coating process, the majority of the coating materials may be fused to the carrier surface, thereby reducing the number of toner impaction sites on the carrier. Fusing of the polymeric coating may occur by mechanical impaction, electrostatic attraction, heat combinations thereof and the like.

Following application of the copolymers to the core, heating may be initiated to permit flow of the coating material over the surface of the carrier core. The concentration of the coating material, in embodiments, powder particles, and the parameters of the heating may be selected to enable the formation of a continuous film of the coating polymers on the surface of the carrier core, or to permit only selected areas of the carrier core to be coated. In embodiments, the carrier with the polymeric powder coating may be heated to a temperature of from about 170° C. to about 280° C., from about 190° C. to about 240° C., for a period of from about 10 min to about 180 min, from about 15 min to about 60 min, to enable the polymer coating to melt and to fuse to the carrier core particles. Following incorporation of the powder on the surface of the carrier, heating may be initiated to permit flow of the coating material over the surface of the carrier core. The powder may be fused to the carrier core in either a rotary kiln or by passing through a heated extruder apparatus, see, for example, U.S. Pat. No. 6,355,391, the disclosure of which hereby is incorporated by reference in entirety.

The coating coverage encompasses from about 10% to about 100% of the carrier core. When selected areas of a carrier core remain uncoated or exposed, the carrier particles may possess electrically conductive properties, such as, when the core material is a metal.

The coated carrier particles may then be cooled, in embodiments, to room temperature, and recovered for use in forming developer.

In embodiments, carriers of the present disclosure may include a core, in embodiments, a ferrite core, having a size of from about 20 to about 100 µm, from about 30 µm to about 75 µm, coated with from about 0.5% to about 10% by weight, from about 0.7% to about 5% by weight, of the polymer coating of the present disclosure, optionally including carbon black.

Thus, with the carrier compositions of the present disclosure, there can be formulated developers with selected high triboelectric charging characteristics and/or conductivity values.

Developers

The toner particles thus formed may be formulated into a developer composition. The toner particles may be mixed with carrier particles to achieve a two-component developer composition. The toner concentration in the developer may be from about 1% to about 25% by weight of the total weight of the developer, from about 2% to about 15% by weight of the total weight of the developer.

Resistivity

To measure carrier conductivity or resistivity, about 30 to about 50 g of the carrier may be placed between two circular planar parallel steel electrodes (radius of about 3 cm) and compressed by a weight of 4 kg to form an about 0.4 to about 0.5 cm layer; a DC voltage of about 10 v may be applied between the electrodes, and a DC current may be measured in series between the electrodes and voltage source after 1 min following the moment of voltage application. Conductivity in (ohm cm)$^{-1}$ may be obtained by multiplying current in amps by the layer thickness in centimeters and dividing by the electrode area in cm² and by the voltage, 10 v. Resistivity may be obtained as the inverse of the conductivity and may be measured in ohm-cm. The voltage may be increased to 150 v and the measurement repeated using the value of the voltage of 150 v.

In accordance with the present disclosure, a carrier may have a resistivity of from about $10^9$ to about $10^{14}$ ohm-cm measured at 10 v and from about $10^8$ to about $10^{13}$ ohm-cm at 150 v.

In accordance with the present disclosure, it has been discovered that developer charging RH sensitivity can be improved by increasing the molar C/O ratio of the carrier coating resin, by using a carrier resin comprising a heterocycle comprising sulfur or both. Thus, developers of the present disclosure may have an RH sensitivity of from about 0.4 to about 1.0, from about 0.6 to about 0.8.

Imaging

The toners can be utilized for electrophotographic processes, including those disclosed in U.S. Pat. No. 4,295,990, the disclosure of which hereby is incorporated by reference in entirety. Any known type of image development system may be used in an image developing device, including, for example, magnetic brush development, hybrid scavengeless development (HSD) and the like. Those and similar development systems are within the purview of those skilled in the art.

It is envisioned that the toners of the present disclosure may be used in any suitable procedure for forming an image with a toner, including in applications other than xerographic applications.

Utilizing the toners of the present disclosure, images may be formed on substrates, including flexible substrates, having a toner pile height of from about 1 to about 6 μm, from about 2 to about 4.5 μm, from about 2.5 to about 4.2 μm.

In embodiments, the toner of the present disclosure may be used for a xerographic print protective composition that provides overprint coating properties including, but not limited to, thermal and light stability and smear resistance, particularly in commercial print applications. More specifically, such overprint coating as envisioned has the ability to permit overwriting, reduce or prevent thermal cracking, improve fusing, reduce or prevent document offset, improve print performance and protect an image from sun, heat and the like. In embodiments, the overprint compositions may be used to improve the overall appearance of xerographic prints due to the ability of the compositions to fill in the roughness of xerographic substrates and toners, thereby forming a level film and enhancing glossiness.

The following Examples are submitted to illustrate embodiments of the disclosure. The Examples are intended to be illustrative only and are not intended to limit the scope of the disclosure. Also, parts and percentages are by weight unless otherwise indicated. As used herein, "room temperature," refers to a temperature of from about 20° C. to about 30° C.

EXAMPLES

It was observed that polymer resins, such as, one containing poly(cyclohexyl methacrylate. CHMA) (PCHMA), provide similar charge as resins including poly(methyl methacrylate, MMA) (PMMA), but with improved RH sensitivity. The cyclohexyl group is superior to the methyl group for RH sensitivity.

It is desirable to have both high charge and good RH sensitivity in a carrier resin. When the 2-(dimethyl amino) ethyl methacrylate (DMAEMA) monomer was added at up to 1.5% by mole to the CHMA monomer as a copolymer coating for carrier, C zone charge (dry conditions) increased generally with increasing amount of DMAEMA. However, performance in the A zone was not improved. As the amount of DMAEMA increased and the C zone charge increased, the RH ratio (the ratio of C zone to A zone charge) also generally increased essentially over 1.

Thus, a higher carbon-to-oxygen (C/O) ratio of a monomer used in a carrier resin improves RH sensitivity while still providing good charge in toners containing silica.

To dissect the mechanisms, molecular interactions among a resin, silica and other elements of a toner and the influence of any one or more of those on toner performance, a computer analysis was conducted on various molecules.

For all substituted methacrylates, a trimer was used to represent the polymer to be examined. To distinguish possible effects of C (carbon) rich and O (oxygen) rich functional groups (alkyl/aromatic and acyl) in the polymer, all three acyl groups were designed to coordinate to the same side.

To mimic a surface hydroxyl of the silica model, a one layer cylinder-like silica model was used to design the surface-treated silicas with the formula, $Si_{12}O_{32}H_{16}$. In the model, all silicas were in tetrahedral geometry and connected by oxygen. The edge of the cylinder was terminated by two hydroxyl groups to represent the geminal silanols $[Si(OH)_2]$, which are typical on the surface of β-cristobalite, identified experimentally on the amorphous silica surface as one of the two types of surface hydroxyl group of untreated silica (see, e.g., Leonardelli et al., J Am Chem Soc (1992) 114:6412; and Vigné-Maeder & Sautet, J Phys Chem (1997) 101(41):8197, each herein incorporated by reference in entirety). All calculations were performed with the DMol3 module from the Accelrys Matrials Studio 4.2 commercial software package. Density functional theory (DFT) was used for the study of surface electronic properties of all models and the coupled toner/carrier complexes.

Recent extension of the DMol3 density functional method is designed to do electronic structure calculations for local and gradient-dependent functional, depending on the accuracy needed. Perdew's 91 generalized gradient approximation (PW91) was employed as the density functional method (Perdew, Physica B 172:1-6, 1991; and Perdew et al., Phys Rev Lett 77(18)3865-3868, 1996). For basis sets, a double numerical basis set with d-polarization functions (DND) was used for all calculations. Using DFT may require careful and extensive functional exploration. For different basis set types, it has been reported that DND performs better than a Gaussian-type basis set of the same size, which is 6-31G*. The DND numerical solutions can give highly accurate DFT solutions for the separated atoms limit for molecular and solids calculations.

The initial structure, optimized structure and electronic properties of adsorbed polymer complexes on the silica were studied. The geometry optimization convergence was achieved when the energy, gradient and displacement were lower than $2 \times 10^{-5}$ Ha, $4 \times 10^{-3}$ Ha/Å, and $5 \times 10^{-3}$ Å, respectively, where Ha is the Hartree atomic units (au) and 1 au=$4.359 \times 10^{-18}$ J. The calculations of HOMO and LUMO orbitals were performed to understand the direction of charge transfer of the above models and to identify the most essential factor(s) that could impact electron transfer in those complex models.

Electron transfer active sites on different materials are crucial to triboelectric charge as the root and destination of electron transfer and the relative ability of donating and accepting electrons will directly determine the triboelectric charge properties of certain toner/charger pairs.

To explore the reverse gap and the forward gap of charge transfer, the excited orbitals for the above systems were studied. Generally, 10 levels of orbital above (M+9) and below (n−9) the Fermi levels were calculated. The lowest energy gap for both forward electron transfer and reverse electron transfer were collected from the sets of twenty orbitals. The calculation errors of those energy gaps were evaluated by comparing the forward and reverse electron transfer barrier of DMAEMA dimer and trimer/silica complexes.

To model electron transfer from the carrier coating resin to the silica toner additive, a carrier resin silica complex comprising a trimer unit of the carrier resin and a silica surface model was analyzed. Silica is commonly used as a developer additive and is a dominant charging material in most negative charging toners.

It is art recognized that in the usual intramolecular electron transfer within a single material, the adsorption of sufficient energy from a photon, collision or thermal energy, can result in transfer of an electron from the highest occupied molecular orbital (HOMO) to the lowest unoccupied molecular orbital (LUMO). Since the electron and hole (left when the electron leaves the HOMO) are both on the same molecule, there is no net charge change of the molecule. The size of the energy gap determines the amount of energy required to transfer the electron between the orbitals. Thus, the carrier resin and toner additive before contact have a HOMO and a LUMO and an associated gap. It should be noted that there are potentially other energy levels above the LUMO (known as LUMO+1. LUNO+2 etc. of increasing energy) and below HOMO (known as HOMO−1, HOMO−2 etc. of decreasing energy). So, in general, an electron can be transferred from a HOMO−n to a LUMO+m, where n and m≥0 within a material. HOMOn=0 is written as HOMO and LUMOm=0 as LUMO.

It was observed that on contact of toner additive and carrier, several certain possibilities arise for the location of HOMO−n and the LUMO+m. The contact of the two materials may result in the HOMO−n being located on the carrier resin and LUMO+m on the toner additive. In that situation, the electron transfer will charge the carrier resin positive and the toner additive negative, the desired transfer for negative charging toner. On the other hand, if the LUMO+m is located on the carrier resin and the HOMO−n is on the toner additive, the electron transfer will charge the toner additive positive and the carrier resin negative, which is not desirable for a negative charging toner. Of course, the HOMO and LUMO may be located on just one molecule or could be partially on both molecules. The disposition of the frontier molecular orbitals that results is a consequence of the properties of the two materials and the interaction thereof also depends on the orientation of the two molecules in contact. In a bulk sample of material, different orientations of the molecules in contact will be obtained randomly. So, the overall charge transferred is the sum of those different processes. The more important processes for charge transfer will be that of the lowest energy. Thus, in the collection of the modeling data, orientations of contact were determined and the lowest energy gap for the forward charge transfer (polymer to silica) desired (e.g., negative toner charge) and lowest energy gap for reverse charge transfer (silica to polymer) (i.e., positive toner charge) were identified.

The key attributes for high negative toner charge are as follows:

1) the energy gap for the forward charge transfer needs to be low;
2) the reverse energy gap should be higher than the forward gap (a negative gap difference, subtracting (1) from (2));
3) the resin has a high C/O ratio monomer;
4) the $T_g$ of the resin must be relatively high; and
5) the water adsorption at the charging site must be low.

Example 1

For attributes 1) and 2), Table 1 below shows electron charge transfer to silica (desirable) to electron charge transfer to a polymer (not desirable) for a number of different coating materials. Shown are data for repeat units based on tetrahydrothiopyranyl methacrylates. Also shown are data for repeat units that are disubstituted and trisubstituted with S. The corresponding monomers for the polymers are 1,3-dithian-4-yl methacrylate (A), 1,3-dithian-2-yl methacrylate (B) and 1,3-dithian-5-yl methacrylate (C), 1,2-dithian-4-yl methacrylate (D), which are disubstituted in the ring with sulphur, and 1,3,5-trithian-6-yl methacrylate (E), which is trisubstituted by sulphur in the ring.

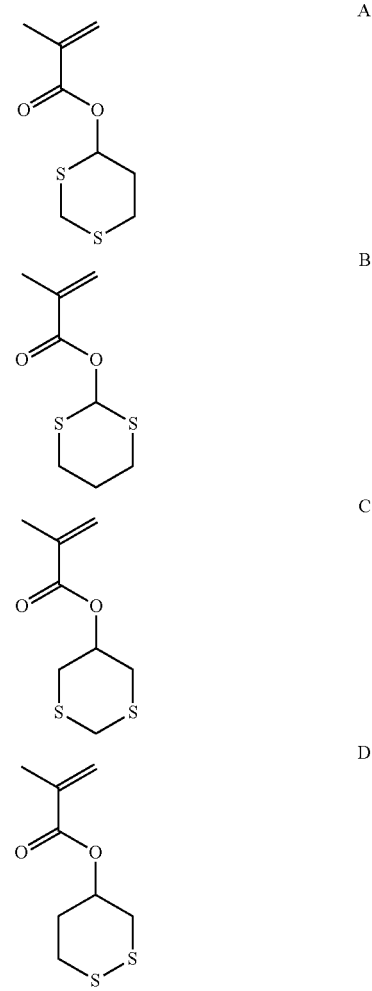

E

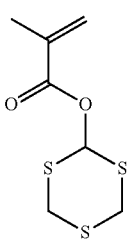

TABLE 1

Modeling Data for Charge Transfer

| Polymer Monomer Repeat Unit(s) | Charge Transfer Polymer to Silica (eV) | Charge Transfer Silica to polymer (eV) | Data Positive Carrier Charge Prediction | Measured Charging | C/O Ratio | Measured RH Ratio |
|---|---|---|---|---|---|---|
| MMA | 4.79 | 6.24 | Good | Good | 2.5 | Worse than CHMA |
| CHMA | 4.67 | 6.51 | Good | Good | 5.0 | Good |
| CHMA/DMAEMA | 4.28 | 6.26 | Good-higher | Good-higher | ≈5 | Worse than CHMA and worsens as more DMAEMA added |
| DMAEMA | 3.73 | 5.23 | Good-higher | | 4 | |
| Tetrahydrothiopyran-4-yl-MA | 3.42 | 6.09 | Good-higher | | 4.5 | |
| Tetrahydrothiopyran-3-yl-MA | 3.98 | 5.97 | Good-higher | Good-higher | 4.5 | Good |
| Tetrahydrothiopyran-2-yl-MA | 4.70 | 5.90 | Good | | 4.6 | |
| 1,3-dithian-4-yl MA | 4.32 | 5.76 | Good-higher | | 4 | |
| 1,3-dithian-2-yl MA | 4.58 | 5.74 | Good | | 4 | |
| 1,3-dithian-5-yl MA | 4.11 | 5.69 | Good-higher | | 4 | |
| 1,2-dithian-4-yl MA | 3.85 | 5.01 | Good-higher | | 4 | |
| 1,3,5-dithian-6-yl MA | 4.41 | 4.88 | Good | | 3.5 | |

The data showed that with the MMA repeat unit, the gap for forward transfer is lower than the gap for reverse transfer (4.79 vs. 6.24 eV) thereby predicting positive charge for MMA and negative charge for the toner silica, as desired. It is known that PMMA comprising the MMA repeat unit has good charging. Using MMA as a reference, materials that have a lower forward vs. reverse energy gap and a lower forward energy gap than MMA will charge higher, and materials having a higher forward energy gap will charge lower, but still positive. If the forward energy gap is higher than the reverse gap the carrier will charge negative, and the toner silica positive.

The data in the table show that the polymers will charge positive as required for negative toner charge as the forward gaps are lower than the reverse gaps. Thus, PCHMA, comprising the CHMA monomer, has good charging, similar to PMMA, as the charge transfer gaps are about equal. The modeling data agree with experimental observations, PCHMA charges similarly to PMMA (under dry conditions, the effect of water on charge is not considered). The next entry shows that adding DMAEMA to PCHMA improves charge transfer by lowering the forward energy gap. The DMAEMA resin has even a lower forward gap energy vs. reverse energy gap (3.73 eV v. 5.23 eV). Hence, as observed, adding DMAEMA to PCHMA did increase charge on the polymer.

The repeat unit for tetrahydro-2H-thiopyran-4-yl methacrylate (the monomer is tetrahydro-2H-thiopyran-4-yl 2-methylprop-2-enoate) has a lower forward energy gap vs. reverse energy gap (3.42 eV v. 6.09 eV) than that of DMAEMA, and thus, is even more potent in providing high charge to the polymer. Similarly, the tetrahydrothiopyran-3-yl methacrylate repeat unit also has a lower forward energy gap vs. reverse energy gap (3.98 eV vs. 5.97 eV) than does DMAEMA, and thus is also more potent in providing high charge to the polymer than does DMAEMA. Charge measurements show higher charge with good RH sensitivity when tetrahydrothiopyran-3-yl methacrylate is added to PCHMA resin. The tetrahydrothiopyran-2-yl methacrylate repeat unit also has a lower forward energy gap vs. reverse energy gap (4.70 eV vs. 5.90 eV), but is not lower than that of DMAEMA, being about the same as that of CHMA and PMMA. Thus, while still effective for positive charging, that isomer is not as potent to provide high charge. The dithianyl methacrylate and trithianyl methacrylate repeat units all have lower forward energy gaps as compared to reverse energy gaps, and all have lower forward energy gaps than that of CHMA, and thus increase the positive charging as compared to CHMA. Thus, the mono, di and tri sulphur substituted rings are generally effective to improve positive charge as carrier coatings when charging against silica surface additives on toner.

Example 2

Synthesis of CHMA Resin

A latex emulsion including polymer particles generated by emulsion polymerization was prepared as follows. An aqueous surfactant solution including about 0.75 g sodium lauryl sulfate (SLS) and about 380 g of de-ionized water (DIW) was prepared by combining the two in a beaker and mixing for about 10 min. The aqueous surfactant solution was then transferred into a reactor. The reactor was continuously purged with nitrogen while being stirred at about 450 rpm. Separately, about 0.47 g of ammonium persulfate initiator was dissolved in about 4 g of DIW to form a solution. In a separate container, about 112 g of cyclohexylmethacrylate were added to a beaker to form a monomer solution. About 10% by weight of the monomer solution were added to the aqueous surfactant mixture as a seed. The reactor then was heated to about 65° C. at a controlled rate of about 1° C./min. Once the temperature of the reactor reached about 65° C., the initiator solution was added to the reactor and stirred for 40 min after which the rest of the monomer solution was fed continuously to the reactor using a metering pump at a rate of about 0.8% by weight/minute. Once all the monomer solution was charged into the main reactor, the temperature was held at about 65° C. for an additional 2 hr to complete the reaction. Full cooling then was applied and the reactor temperature was reduced to about 35° C. The product then was collected in a container and dried to a powder form using an FTS Systems freeze drier. The final latex size as determined using a Nanotrac Particle Size Analyzer (Microtrac) was 89 nm.

Example 3

Synthesis of CHMA and DMAEMA Resin

A latex emulsion was prepared and dried in the same manner as in Example 2 except that the monomer solution also contained 1.05 g dimethyl-amino ethylmethacrylate. The final latex size was 103 nm.

Example 4

Synthesis of tetrahydrothiopyran-3-yl methacrylate monomer

Freshly distilled tetrahydrothiopyran-3-ol (8.97 g, 75.3 mmol) and triethylamine (10.6 mL, 75.5 mmol) were dissolved in anhydrous tetrahydrofuran (THF) (40 mL) and cooled to 0° C. Methacryloyl chloride (8.1 mL, 83.2 mmol) was then added slowly, dropwise. The reaction then was warmed slowly to room temperature. After stirring overnight, 30 mL DIW were added and the mixture was made basic with 5 M NaOH. The THF then was removed by rotary evaporation and the product was extracted with diethyl ether (3×40 mL). The ether extracts were combined and washed with 0.1 M NaOH, followed by DIW before being dried over sodium sulfate and filtered. The product was then concentrated by rotary evaporation and dried in vacuo to afford tetrahydro-2H-thiopyran-3-yl methacrylate as a light orange liquid (7.63 g, 54%). $^1$H NMR (600 MHz, CDCl$_3$, ppm) δ 6.08 (s, 1H), 5.54 (s, 1H), 4.94 (m, 1H), 2.78 (m, 1H), 2.62 (m, 1H), 2.49 (m, 1H), 2.47 (m, 1H), 2.14 (m, 1H), 1.99 (m, 1H), 1.91 (s, 3H), 1.85 (m, 1H), 1.49 (m, 1H). $^{13}$C NMR (150 MHz, CDCl$_3$, ppm) δ 166.61, 136.69, 125.62, 71.21, 32.26, 31.82, 28.10, 27.43, 18.43.

Example 5

Synthesis of tetrahydrothiopyran-4-yl methacrylate 4-oxothiane (5.14 g, 44.2 mmol) was dissolved in methanol (40 mL) under an atmosphere of nitrogen and cooled to 0° C. Sodium borohydride (0.5 g, 13.2 mmol) then was added slowly in portions. After 30 min., 5 M NaOH (10 mL) and 30 mL DIW were added and the product was extracted with dichloromethane (3×40 mL). The dichloromethane extracts were combined, dried over sodium sulfate, filtered and concentrated by rotary evaporation. The crude yellow oil was purified by flash chromatography on silica gel (1:9 ethyl acetate:hexanes) to afford tetrahydropyran-4-ol as a white solid (4.96 g, 96%). $^1$H NMR (600 MHz, CDCl$_3$, ppm) δ 3.53 (m, 1H), 2.83 (m, 1H), 2.69-2.63 (m, 2H), 2.50 (m, 2H), 2.09-2.03 (m, 2H), 1.59 (m, 2H). $^{13}$C NMR (150 MHz, CDCl$_3$, ppm) δ 68.95, 68.15, 36.66, 36.42, 36.30, 36.06, 35.80, 35.68, 35.45, 27.61, 27.14, 26.95, 26.70, 26.41, 25.93. GC-MS: found m/z 118 (calcd for C$_5$H$_{10}$OS: m/z 118.20).

Tetrahydrothiopyran-4-ol (4.81 g, 40.7 mmol) and triethylamine (6.2 mL, 44.5 mmol) were dissolved in anhydrous dichloromethane (60 mL) and cooled to 0° C. Methacryloyl chloride (4.0 mL, 45.0 mmol) then was added slowly, dropwise. The reaction then was warmed slowly to room temperature. After stirring overnight, the reaction was washed with DIW (20 mL), 1 M NaOH (2×20 mL), DIW (20 mL), 1 M HCl (20 mL), DIW (20 mL) and brine (20 mL). The organic layer then was dried over sodium sulfate, filtered, and then concentrated by rotary evaporation and dried in vacuo to afford tetrahydro-2H-thiopyran-4-yl methacrylate as a pale yellow liquid (4.85 g, 61%). $^1$H NMR (600 MHz, CDCl$_3$, ppm) δ 6.07 (s, 1H), 5.52 (s, 1H), 4.88 (m, 1H), 2.77 (m, 2H), 2.55 (m, 2H), 2.07 (m, 2H), 1.90 (m, 5H). $^{13}$C NMR (150 MHz, CDCl$_3$, ppm) δ 166.29, 166.23 (minor), 136.55, 13.70 (minor), 125.40 (multiplet: 126.58, 126.31, 125.72, 125.28, 125.07, 124.65, 124.19), 70.86, 69.86 (minor), 32.33 (multiplet: 32.59, 32.44, 32.21, 32.04), 25.71 (multiplet: 26.66, 26.19, 25.71, 25.44, 24.95), 18.26 (multiplet: 18.43, 18.09).

Example 6

CHMA and tetrahydro-2H-thiopyran-3-yl methacrylate resin

A surfactant solution consisting of 0.3348 g SLS and 170.09 g of DIW was prepared by mixing for 10 min in a beaker. The aqueous surfactant solution then was transferred into the reactor. The reactor then was purged continuously with nitrogen while being stirred at 450 rpm. In a separate container were combined 50 g cyclohexylmethacrylate and 0.2768 g tetrahydro-2H-thiopyran-3-yl methacrylate. Ten percent by weight of that solution were added to the aqueous surfactant mixture as a seed. The reactor then was heated to 65° C. at a controlled rate, and held at that temperature. Separately 0.2098 g of ammonium persulfate initiator were dissolved into 1.8 g of DIW to form the initiator solution. The initiator solution then was added dropwise into the reactor and after 40 min the rest of the emulsion was fed continuously using metering pump at a rate of 0.8% by weight/min over 2 hr. Once all monomer emulsion is charged into the main reactor, the temperature is held at 65° C. for an additional 3 hr to complete the reaction. Full cooling then was applied and reactor temperature was reduced to 35° C. The product was collected into a container and dried to a powder using a freeze drier. The final latex particle size was 77 nm with a standard deviation of 19 nm. The onset $T_g$ of the freeze dried latex was 96.1° C. The Mw was 651,000 and the Mn was 213,000.

Example 7

Preparation and Analysis of Carrier

Carrier was prepared by adding 120 g of a 35 µm ferrite core in a 250 ml polyethylene bottle. Then, 0.912 g of dried powder polymer latex were added. The bottle was sealed and loaded into a C-zone Turbula mixer. The Turbula mixer was run for about 45 min to disperse the powder onto the carrier core particles. Next, a Haake mixer was setup with the following conditions: set temperature 200° C., 30 min batch time, 30 rpm, high shear rotors. After the Haake mixer reached the operating temperature, the mixer rotation was started and the blend from the Turbula was transferred into the Haake mixer. After about 45 min, the carrier was discharged from the mixer and sieved through a 45 µm screen.

Developers were prepared with the various resins listed in Table 2 by combining with a Xerox 700 Digital Color Press cyan toner. The concentration of the toner was about 5 pph. Developers were conditioned overnight in the high temperature, high humidity A-zone at 28° C./85% RH and low temperature, low humidity C-zone at 12° C./15% RH and then sealed and agitated for 60 min using a Turbula mixer. Charging characteristics were obtained as q/m values in µC/g using the total charge blow-off method and by a charge spectrograph using a 100 V/cm field as q/d values in mm displacement. The q/d values can be converted from mm displacement to fC/µm by multiplying the value in mm by 0.092. The charging results are set forth below in Table 2.

Charging for a carrier comprised of cyclohexyl methacrylate with 0.5% tetrahydro-2H-thiopyran-3-yl methacrylate is shown in Table 2, showing higher charge than a comparative carrier coated with cyclohexyl methacrylate in both A-zone and C-zone and better RH sensitivity for both q/d and q/m ratio. Thus, 0.5% tetrahydro-2H-thiopyran-3-yl methacrylate is an effective charge control agent to increase charge and also to improve RH sensitivity. Cyclohexyl methacrylate with 1% DMAEMA had the A-zone charge increased to higher than with 0.5% tetrahydro-2H-thiopyran-3-yl methacrylate, however, C-zone charge also was higher, and thus the RH ratio for both q/d and q/m has decreased as compared to that of cyclohexyl methacrylate. Thus the 0.5% tetrahydro-2H-thiopyran-3-yl methacrylate provides both a higher charge and an improved RH ratio as compared to that of CHMA, and does not degrade the RH ratio as DMAEMA addition does. The higher RH ratio with 0.5% tetrahydro-2H-thiopyran-3-yl methacrylate for both q/d and q/m is anticipated to result in improved latitude for performance in an electrophotographic printer, as is known in the art, a q/d that is too low in the A-zone results in more background and dusting of the toner, while a high q/m in the C-zone results in poor toner image development and lighter images on the print. Thus, a better RH ratio increases the range for good dark images and no background. The overall charge level can be varied as desired by the methods described above.

TABLE 2

Charge Performance for Methacrylate Coated Carriers

| | A-zone | | C-zone | | RH ratio | |
|---|---|---|---|---|---|---|
| | q/d | q/m | q/d | q/m | q/d | q/m |
| Cyclohexyl methacrylate | 5.6 | 28.0 | 12.0 | 48.8 | 0.47 | 0.57 |
| Cyclohexyl methacrylate + 1% DMAEMA | 9.5 | 41.9 | 23.0 | 93.8 | 0.41 | 0.45 |
| Cyclohexyl methacrylate + 0.5% tetrahydro-2H-thiopyran-3-yl methacrylate | 7.3 | 39 | 14.9 | 58 | 0.49 | 0.67 |

Example 8

The MMA repeat unit C/O ratio is low at 2.5 and MMA has poor RH sensitivity. The CHMA repeat unit has a C/O ratio of 5 and has an improved RH ratio. DMAEMA has a C/O ratio of 4, slightly less than CHMA, and DMAEMA can degrade RH sensitivity. The tetrahydrothiopyran methacrylate repeat unit has a C/O ratio of 4.5, better than that of DMAEMA, though slightly lower than that of CHMA. Hence, tetrahydrothiopyran methacrylate provides higher charge as does DMAEMA, but with less water adsorption, and thus, a better RH sensitivity. The thianyl group provides a very strong positive charge. Thianyl-containing resins will be effective at low levels and can be combined with high C/O monomers, such as, CHMA, to maximize RH stability.

In the carrier powder coating process, the $T_g$ must be low enough to coat at elevated temperatures (200° C. is a typical coating temperature) but high enough so that the resin does not flow under normal transportation and shipping temperatures, or does not flow under conditions encountered in the printer when running, which would lead to toner and additive impaction and even developer blocking. Since the developer can potentially reach 55° to 60° C. in the machine, a $T_g$ higher than such temperatures is desirable. PMMA and CHMA have a $T_g$ of 100° C. and coat very well in the powder coating process, and the coating may have an operative $T_g$ range from about 80° to about 140° C.

Replacing the methyl group in MMA with the cyclic CHMA group has little effect on $T_g$. Linear alkyl methacrylates with longer chains and thus higher C/O ratios, have low $T_g$: for methacrylates, methyl is 100° C., ethyl, 65° C., butyl, 29° C. and hexyl is −3° C. Thus, for the operative C/O ratios of the present disclosure (i.e., above at least 4), the $T_g$ is too low with longer aliphatic chains. Acrylates (as opposed to methacrylates) are generally unsuitable having a lower $T_g$.

DMAEMA has a $T_g$ of 18° C., though copolymerized with CHMA, at least in small quantities, and does not affect $T_g$ of the copolymer strongly.

A favorable structure for high C/O ratio and a high $T_g$ comprises a cyclic hydrocarbon, such as, the 6-membered CHMA. Substitution of sulfur for carbon in thianyl, for example, will have only a small effect on $T_g$ (i.e., comparing the thiane group to cyclohexyl). Thus, the high charging thianyl methacrylate will have a higher $T_g$.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims.

Unless specifically recited in a claim, steps or components of claims should not be implied or imported from the specification or any other claims as to any particular order, number, position, size, shape, angle, color or material.

All references cited herein are herein incorporated by reference in their entireties.

The invention claimed is:

1. Resin particles comprising a copolymer:
   wherein the copolymer comprises,
   at least one cycloacrylate monomer;
   at least one charge control agent monomer comprising a structure as set forth in formula (I) or isomers thereof:

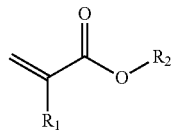

Formula (I)

wherein $R_1$ is methyl or H; and $R_2$ is an aryl, a cyclic heteroalkyl, cyclic heteroalkylalkyl or a cyclic heteroalkylaryl comprising at least one sulfur atom, and wherein the resin has a carbon:oxygen (C/O) ratio of at least about 4, and wherein the copolymers form particles with a size from about 40 nm to about 200 nm.

2. The resin particles of claim 1, wherein the charge control agent monomer is present in the copolymer in an amount from about 0.1% to about 5% by weight of the copolymer.

3. The resin particles of claim 1, wherein the cycloacrylate monomer is present in the copolyner from about 50% to about 95% by weight of the copolymer.

4. The resin particles of claim 1, wherein the cycloacrylate monomer is selected from the group consisting of cyclohexylmethacrylate (CHMA or polyCHMA), cyclopropyl acrylate, cyclobutyl acrylate, cyclopentyl acrylate, cyclohexyl acrylate, cyclopropyl metbacrylate, cyclobutyl methacrylate, cyclopentyl methacrylate, isobornyl methacrylate, isobornyl acrylate, and combinations thereof.

5. The resin particles of claim 1, wherein $R_1$ is methyl.

6. The resin particles of claim 1, wherein $R_2$ is a $C_5$-$C_7$ cyclic heteroalkyl.

7. The resin particles of claim 1, wherein $R_2$ is selected from the group consisting of dithietane, thietane, trithiane, dithiepane, trithiepane, dithiocane, trithiocane, thiolane, dithiolane, thiane, dithiane, thiepane and thiocane.

8. The resin particles of claim 1, wherein $R_2$ is thiane.

9. The resin particles of claim 1, wherein the aryl, cyclic heteroalkyl, cyclic heteroalkylalkyl or cyclic heteroalkylarvl comprises optional substituents.

10. The resin particles of claim 1, comprising at least one monomer having the structure as set forth in formula (II) or isomers thereof:

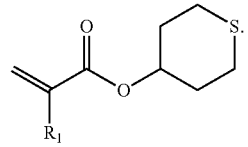

Formula (II)

11. The resin particles of claim 10, wherein $R_1$ is methyl.

12. Resin particles comprising a copolymer:
   wherein the copolymer comprises,
   at least one cyclohexylmethacrylate monomer;
   at least one charge control agent monomer having the structure as set forth in formula (II) or isomers thereof:

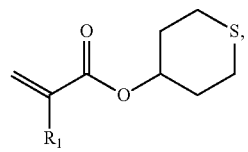

Formula (II)

wherein $R_1$ is methyl or H, and the copolymers form particles with a size from about 40 nm to about 200 nm.

* * * * *